(No Model.) 3 Sheets—Sheet 2.

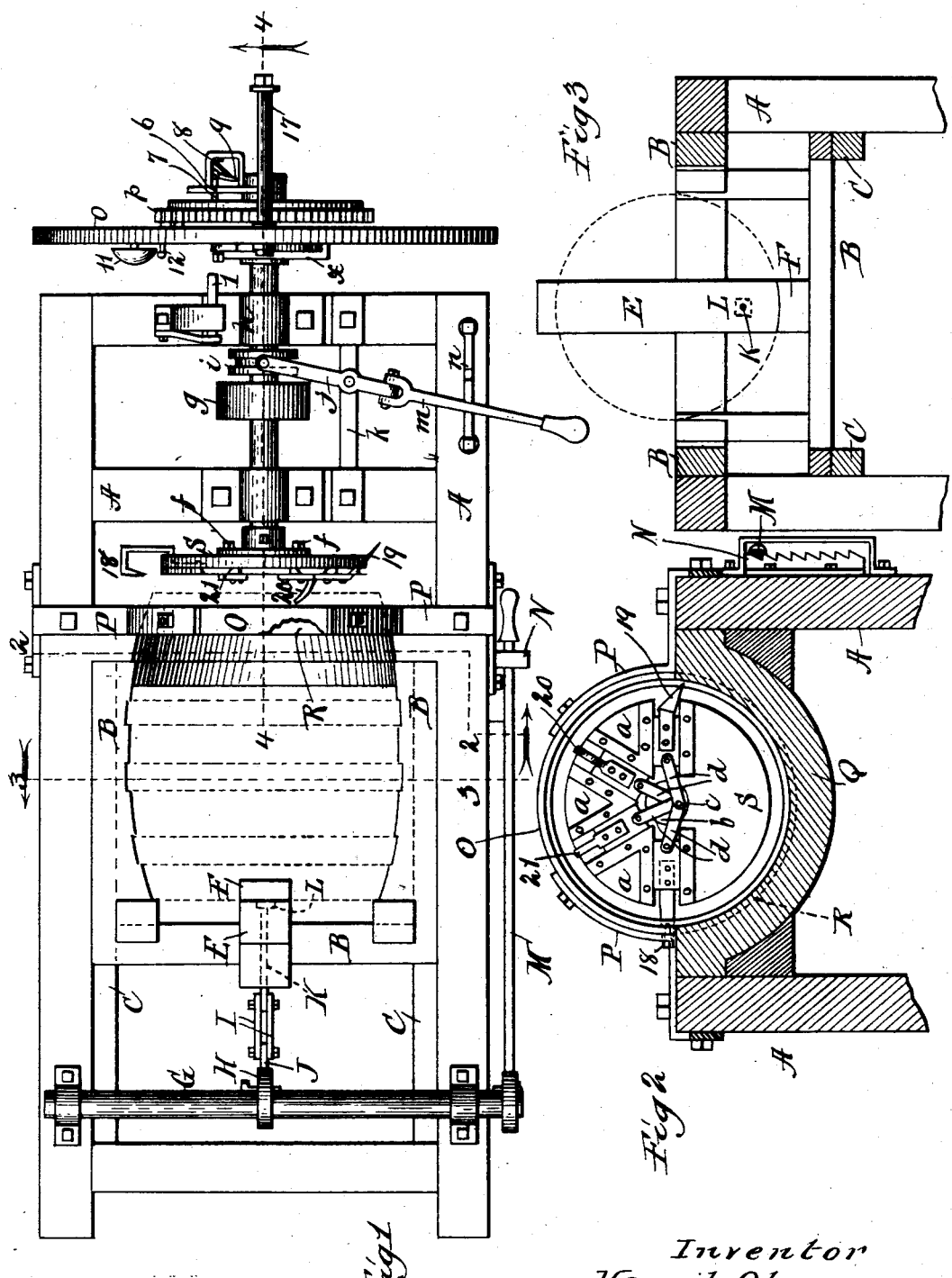

H. OLSEN.
CHAMFERING AND CROZING MACHINE.

No. 525,510. Patented Sept. 4, 1894.

Witnesses
W. C. Coches
Jno. A. Christianson

Inventor
Henrik Olsen
By Coburn & Thacher
Attys (No Model.) 3 Sheets—Sheet 3.
H. OLSEN.
CHAMFERING AND CROZING MACHINE.
No. 525,510. Patented Sept. 4, 1894.
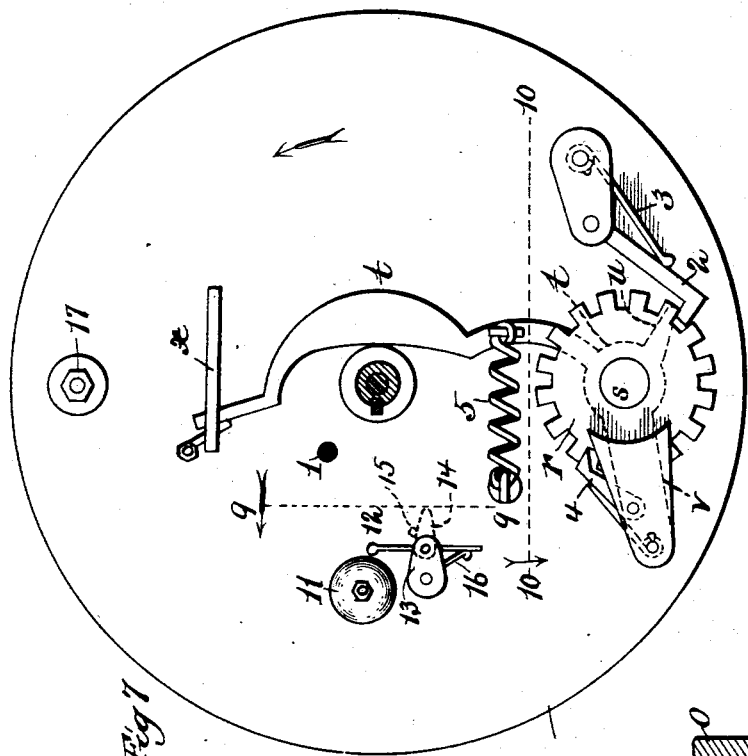
Fig 7.
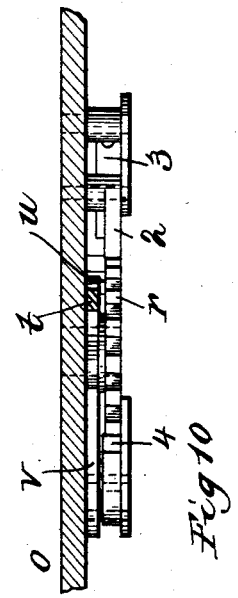
Fig 10.
Fig 9.
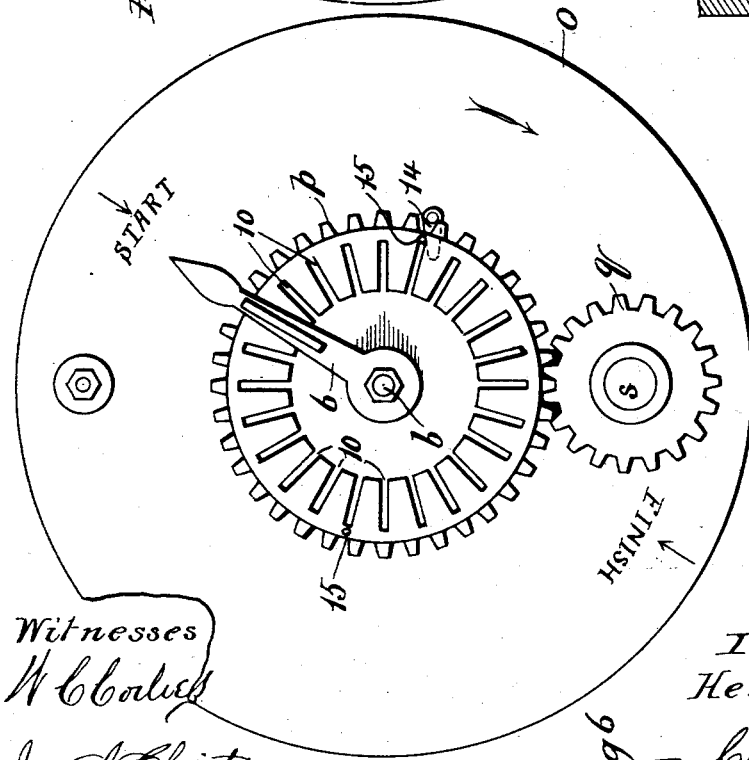
Fig 6.
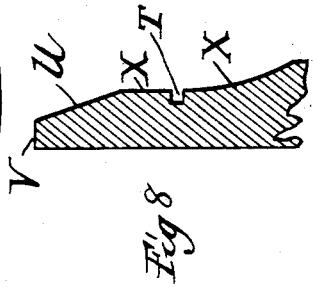
Fig 8.
Witnesses
W. C. Coolick
Jno. A. Christianson.
Inventor
Henrik Olsen
By Coburn & Thacher
Attys.

UNITED STATES PATENT OFFICE.

HENRIK OLSEN, OF AALESUND, NORWAY.

CHAMFERING AND CROZING MACHINE.

SPECIFICATION forming part of Letters Patent No. 525,510, dated September 4, 1894.

Application filed November 1, 1893. Serial No. 489,736. (No model.) Patented in Norway March 16, 1887, No. 455.

*To all whom it may concern:*

Be it known that I, HENRIK OLSEN, a subject of the King of Sweden and Norway, residing at Aalesund, Norway, have invented a certain new and useful Improvement in Chamfering and Crozing Machines, (for which patent was obtained in Norway on March 16, 1887, No. 455,) which is fully set forth in the following specification, reference being had to the accompanying drawings, in which—

Figure 4:
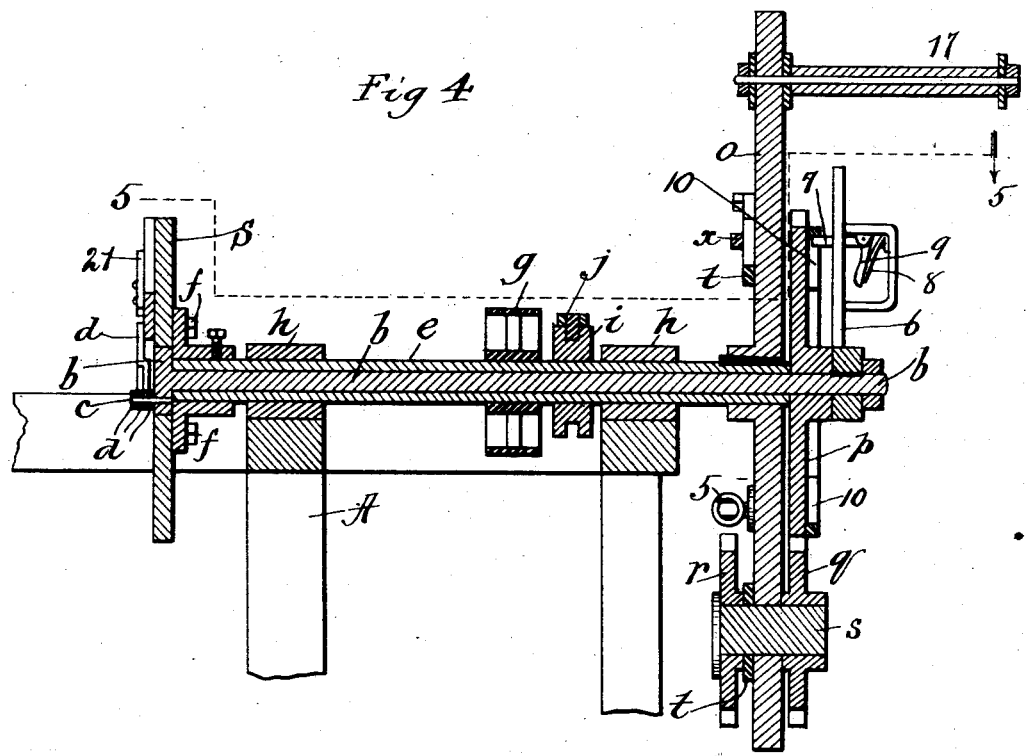
Figure 5:
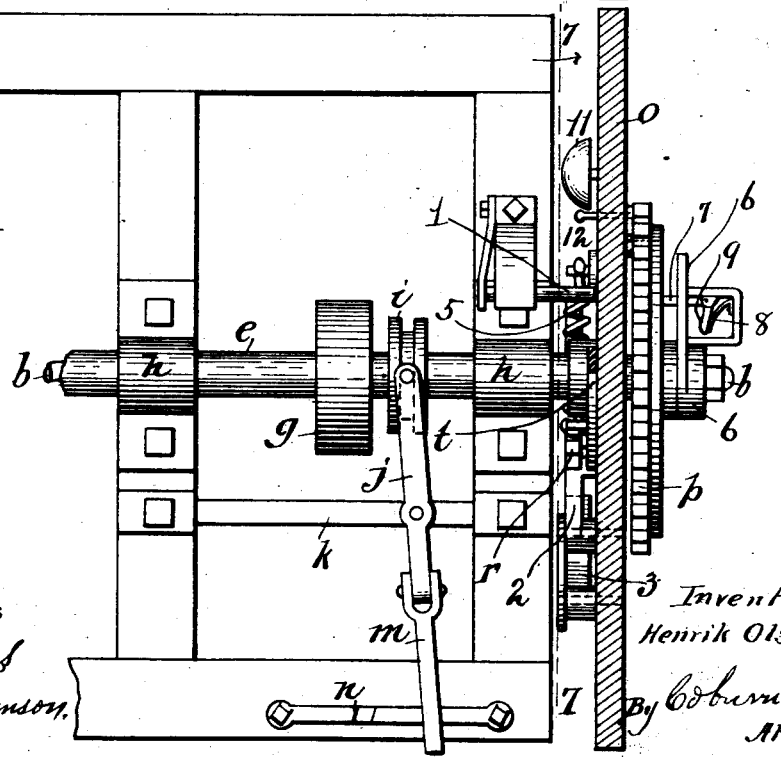

Figure 1 is a top or plan view of my machine, showing the barrel in dotted lines. Fig. 2, is a vertical sectional view, taken at the line 2—2, Fig. 1, looking to the right. Fig. 3, is a vertical sectional view, taken at the line 3—3, looking to the left. Fig. 4, is a vertical, sectional view of one part of the machine, taken at the line 4—4, Fig. 1. Fig. 5, is a top or plan view of that part of the machine which is shown in Fig. 4, with one part of it cut in horizontal section at the line 5—5, Fig. 4, as shown. Fig. 6, is a front elevation of the dial-plate and its front attachments. Fig. 7 is a rear elevation of the same, showing its rear attachments; the parts connecting it to the machine being cut in section at line 7—7, Fig. 5. Fig. 8 is a detached view of one of the staves of the barrel when finished. Fig. 9, is a sectional view, taken at the line 9—9, Fig. 7, looking to the left. Fig. 10, is a horizontal sectional view, taken at line 10—10, Fig. 7, looking downward.

The object of my invention is to make a machine with which one can completely finish the end of a barrel ready to receive the head; and to accomplish this my machine carries four cutting-knives: One of which crozes, another chamfers, another howels, and the other cuts off the ends of the staves uniformly.

My invention consists of the devices and combination of devices hereinafter fully described and made the subject matter of the claims.

In the accompanying drawings, A represents the frame of the machine.

B, is a sliding-frame which slides on the ways C.

E, is an upright firmly secured to the frame B, and on which is a forwardly projecting ledge F. The barrel when in condition to be operated upon is placed in the frame B, one end of it resting on the ledge F, the upright E extending upwardly as high as the height of the barrel. The position of the barrel in the frame B is clearly shown in Figs. 1 and 3.

G, is a rock-shaft, having its bearings on the frame A, to which is secured a sleeve, H, firmly keyed to the rock-shaft, and from which there is a downwardly projecting arm pivotally connected to the link, I, by the rod, J. The link I is also pivotally connected to the bolt, K, which passes through the upright E, and is secured thereto by the nut, L.

M, is a lever rigidly secured to the rock-shaft G, by means of which it is rocked to slide the frame B which holds the barrel, back and forth.

N, are projecting ratchet-teeth attached to the side of the frame of the machine which hold the end of the lever M in position to hold the barrel firmly in place when it is being operated upon.

O, is a curved plate extending over the end of the barrel, and it is secured in position by means of the angle-iron plates P that are bolted to the frame of the machine and to the curved plate O.

Q, is a curved cross-piece to which there is a curved plate R attached which forms a rest for the end of the barrel which is being operated upon. The barrel is placed on the sliding-frame B, and then is moved forward into the support R and the curved plate O by which the end is firmly held while it is being operated upon, as hereinafter described.

S, is a circular tool-holder which in my machine carries four separate cutting tools: one of said tools cuts the croze, T, another tool chamfers a stave, as shown at U, another tool edges the barrel, as shown at V, the fourth tool is a gouge or howel that does the howeling of the barrel, as shown at X. These tools are placed in guides or ways, $a$, and each is connected eccentrically on the end of the shaft $b$, at $c$, by means of connecting-links or bars, $d$. The tool-carrying head S is firmly secured to the sleeve $e$, which surrounds the shaft $b$, by means of bolts, $f$, shown in Figs. 1 and 4.

$g$, is a band-pulley firmly secured to the sleeve $e$, which revolves upon the shaft $b$ and rotates the tool-carrying head S.

$h$, are bearings on the frame A in which the sleeve $e$ rotates, and in which it can slide laterally as well.

$i$, is a grooved sleeve firmly secured to the sleeve $e$; and $j$ is a bifurcated lever pivoted to the cross-piece $k$ on the frame A, by means of which the tool-carrying head S is moved up to its work, there being attached to the end of the lever $j$ a handle, $m$, that can be locked in the notched plate, $n$. There is also secured to the sleeve $e$ by means of a spline, as shown in Fig. 4 of the drawings what I call the dial-plate, $o$, which revolves with the sleeve $e$. The shaft $b$ revoluble within the sleeve $e$, and the connecting-links $d$ which connect the cutting tools eccentrically with the end of the shaft $b$ must be connected pivotally therewith, so that they can be carried around the connecting-pin $c$, as one end of each of these connecting links, being attached to its respective cutting tool, is carried around with the tool-holding head which is rigidly secured to the sleeve $e$. There is mounted on the front end of the shaft $b$ a loose cogged wheel, $p$, normally locked to said shaft as explained below so as to turn it slowly in the sleeve $e$ to bring each of the cutting knives, one after another, into operation to do its work in finishing the barrel. The devices which turn the cogged wheel $p$ consist of the cogged-wheel $q$ and the cogged-wheel $r$, both of which are on the short shaft, $s$, which has its bearing in the dial-plate $o$, as clearly shown in Fig. 4. There is also loosely attached to the shaft $s$ one end of the vibrating lever $t$, which has an arm $u$ and an arm, $v$. The free end of the lever $t$ is held under the guide-loop, $x$, which is attached to the back of the dial-plate, $o$, and which serves as a guide to hold the free end of the vibrating lever $t$ in place.

1 is a pin that is secured to the frame A of the machine and projects laterally contiguous to the dial-plate $o$ where the vibrating-lever $t$ will strike it as the dial-plate $o$ revolves, and be thrown back, so that it will turn the shaft $s$ one notch of the cogged-wheel $r$, the arm $u$ striking against the pivoted dog 2, throwing it back out of the notch in the notched wheel $r$ where it is held by the spring 3 to always hold the shaft $s$ securely in place when it is not removed by the arm $u$. The arm $v$ that is attached to the vibrating lever $t$ carries a spring-dog, 4, which pushes the notched wheel $r$ the width of one notch when the lever $g$ is thrown up by striking the pin 1, and passes over into the next notch when the lever is brought back into its normal position, after passing the pin 1, by the spring 5.

6, is an indicator which is rigidly fixed upon the shaft $b$ and turns with the cogged-wheel $p$ which shows to the operator the position of the cutting-tools with reference to their position for work. There is attached to this indicator a pin, 7, extended by a spring, 8, it being attached to the pivoted lever, 9, so that by pressing back the lever 9, overcoming the tension of the spring 8, the pin is withdrawn from one of the recesses, 10, on the face of the cogged-wheels $p$, when it can be turned and set on the cogged-wheel $p$ at any desired position, at the same time turning the shaft $b$ and setting the cutter-knives in place. By these mechanisms the notched wheel $q$ being attached to the same shaft as the notched-wheel $r$ revolves the cogged-wheel $p$ one notch at each revolution of the cutter-head S, the cutter-head S making a revolution with each revolution of the dial-plate $o$. In this manner the eccentric pin $c$ to which the cutting-tools are connected by link connections, is gradually carried around, causing each tool in its turn to be moved out in the guide-ways $a$ into cutting position and then withdrawn until the entire work of finishing the barrel is completed. There is attached to the dial-plate $o$ a bell, which is sounded by the vibration of the pivoted hammer, 12, that is operated by means of an arm, 14, coming in contact with pins, 15, projecting from the cogged-wheel $p$. The arm 14 comes in contact with the pin 15 only when the revoluble shaft D to which the cogged wheel P is attached has made one revolution in the sleeve which carries the tool-head, and all of the tools have been brought to their work and the end of the barrel is finished. The operator is thus notified that the work is completed. The pin 13 is a stop-pin, which holds the vibrating arm 14 in the required position, the spring 16 throwing the hammer back to sound the gong when it is raised by the vibrating lever 14 as the pin 15 causes it to swing around and raise the hammer.

The indicator 6 is set so as to indicate by reaching a certain point that all of the cutting tools have operated and completed their respective work of howeling, crozing, chamfering and edging barrel staves; the bell or gong also sounds to notify the operator that the end of the barrel which is being operated upon is finished. The operator then throws the cutter-head with the knives back by sliding the sleeve $e$ in its bearings, and also throws the barrel back by means of the lever M, changing the ends of the barrel and finishing the other end. When that barrel is completed he removes it and inserts another barrel and continues the operation as before. I attach to the dial-plate $o$ a handle, 17, by which I can operate the machine by hand, if desired, instead of applying power through a belt to the pulley $g$.

In the accompanying drawings, 18 is the tool that trims the edge V of the barrel-staves; 19 is the chamfering tool; 20 the howeling tool, and 21 the crozing tool, and as the shaft $b$ is gradually rotated, one notch at a time, each of these tools is thrown into action one after another until the four operations are accomplished consisting of howeling, crozing, chamfering, and edging the barrel, thus continuing until the chine of the barrel is completed.

I have built and successfully operated these machines, and find that they do superior work and can be successfully operated in the manufacture of tight barrels.

Having described the construction and operation of my machine, what I claim, and desire to secure by Letters Patent, is—

1. The tool-head having on its face guides in which the tools are carried; the sleeve to which the tool-head is attached; the shaft revoluble within said sleeve and to the end of which the tools are eccentrically connected by link connections; the tools placed in guide-ways on the tool-head each being connected to the same eccentric pin on the end of the revoluble shaft, whereby the tools are advanced to their work and withdrawn successively one tool at a time; a driving pulley attached to the sleeve to revolve it; the dial-plate O rigidly attached to the sleeve which carries the tool-head and gear-wheel rigidly attached to the shaft which passes through the sleeve; gear-wheels having the bearings in the dial-plate O, one of which engages with the cogged wheel on the shaft; and mechanisms which turn the cogged wheels whose bearings are in the dial-plate O when the sleeve which carries the tool-head is revolved, whereby the shaft which is revoluble within the sleeve is turned slowly within the sleeve, gradually moving the tools to and from the work as the sleeve and cutter-head are revolved more rapidly, substantially as specified.

2. The sleeve carrying the cutter-head; the cutter-head carrying the tools; the shaft within the sleeve and revoluble independently of the sleeve; the dial-plate rotated with the sleeve; the pivoted lever pivoted on the dial-plate and provided with arms engaged with the cogged wheel on a shaft having a bearing in the dial-plate; the shaft having a bearing in the dial-plate; the cogged wheels on said shaft; the cogged wheel rigidly attached to the shaft which passes loosely through the sleeve; the eccentric pin on the end of this shaft; the tools in the cutter-head on the sleeve; link connections connecting the tools with the eccentric pin; and the pin on the main frame for vibrating the lever pivoted to the dial-plate; springs for returning the lever when it passes the pin and pawls and stops connecting the lever with the cogged wheels carried by the dial plate, whereby the lever turns the cogged wheels one notch at each revolution of the sleeve, substantially as specified.

3. The indicator attached to the revoluble shaft; the eccentric pin on the end of the shaft; the tools eccentrically connected by link connections to the eccentric pin; and locking device for locking the indicator to the cogged-wheel carried by the shaft whereby the indicator can be used as a handle for turning the shaft and setting the tools in the proper position to commence the work which the machine does on the end of the barrel staves, as specified.

4. The dial-plate o mounted on the sleeve e which carries the tool-holder; a gong or bell mounted on the dial-plate o and carried around with it; the revoluble shaft b; the cutting tools carried in the tool-head and pivoted to links which are pivoted eccentrically to the revoluble shaft; a cogged wheel mounted on the revoluble shaft; and mechanisms connected with the cogged wheel which revolve it one cog at each revolution of the dial-plate o and sleeve e; the pin projecting from the cogged wheel that is carried on the revoluble shaft; and a trip-lever mounted on the dial-plate o in the position to strike the pin on the cogged wheel when the revoluble shaft has made one revolution in the sleeve e and carried all the tools to their work, whereby the gong is sounded, indicating that the end of the barrel is finished.

HENRIK OLSEN.

Witnesses:
KARL L. LEHMANN,
THOS. G. PIHEFELDT.